(12) United States Patent
Bosen et al.

(10) Patent No.: US 10,882,432 B1
(45) Date of Patent: Jan. 5, 2021

(54) MODULAR SEATING SYSTEM

(71) Applicant: Armorworks Holdings, Inc., Chandler, AZ (US)

(72) Inventors: David A. Bosen, Tempe, AZ (US); Jason Weed, Chandler, AZ (US); Valent Horvatich, Scottsdale, AZ (US)

(73) Assignee: Armorworks Holdings, Inc., Chandler, AZ (US)

( * ) Notice: Subject to any disclaimer, the term of this patent is extended or adjusted under 35 U.S.C. 154(b) by 0 days.

(21) Appl. No.: 16/669,318

(22) Filed: Oct. 30, 2019

Related U.S. Application Data

(60) Provisional application No. 62/752,882, filed on Oct. 30, 2018.

(51) Int. Cl.
| | |
|---|---|
| *B60N 2/62* | (2006.01) |
| *B60N 2/64* | (2006.01) |
| *B60N 2/68* | (2006.01) |
| *B60N 2/882* | (2018.01) |
| *B60N 2/90* | (2018.01) |

(52) U.S. Cl.
CPC ............... *B60N 2/99* (2018.02); *B60N 2/882* (2018.02)

(58) Field of Classification Search
CPC .................................. B60N 2/882; B60N 2/99
USPC ........ 297/219.1–229, 440.1, 440.14, 452.23, 297/452.24, 452.25, 452.26, 452.33, 297/452.34, 452.35, 452.36
See application file for complete search history.

(56) References Cited

U.S. PATENT DOCUMENTS

| | | | | |
|---|---|---|---|---|
| 3,542,421 A | * | 11/1970 | Ambrose ............. | B60N 2/6054 297/230.12 |
| 4,679,854 A | * | 7/1987 | Putsch et al. ............ | B60N 2/00 297/486 |
| 4,753,482 A | * | 6/1988 | Warren .................... | A61G 5/00 297/452.26 |
| 4,793,652 A | * | 12/1988 | Hannah et al. .......... | A61G 5/10 297/452.36 X |
| 4,869,551 A | * | 9/1989 | Lathers ................... | B63B 29/04 297/440.1 |
| 5,366,277 A | * | 11/1994 | Tremblay ............. | A47D 15/006 297/440.14 X |
| 5,441,331 A | * | 8/1995 | Vento ...................... | B60N 2/10 297/452.33 |
| 5,533,787 A | * | 7/1996 | Xiang ..................... | B60N 2/66 297/228.1 X |
| 5,615,928 A | | 4/1997 | Penley | |
| 5,769,498 A | | 6/1998 | Smith et al. | |
| 5,803,544 A | * | 9/1998 | Block ...................... | B60N 2/24 297/440.2 X |
| 5,934,749 A | * | 8/1999 | Pond et al. .......... | B60N 2/7005 297/219.1 |

(Continued)

*Primary Examiner* — Rodney B White
(74) *Attorney, Agent, or Firm* — James L Farmer

(57) ABSTRACT

Apparatus and methods are provided for a modular vehicle seating system. In one embodiment the seating system has a universal center module that is mountable to a seating position in a vehicle and includes seat pan and seat back portions. The seating system may further include a matched pair of modular side bolsters selectable from an assortment of matched pairs of side bolsters, where each matched pair has a particular physical property defined by a unique value in a range of values of the physical property in the assortment. The side bolsters are detachably connectable to the to left and right sides of the universal center module with fasteners.

16 Claims, 6 Drawing Sheets

(56) References Cited

U.S. PATENT DOCUMENTS

| | | | | |
|---|---|---|---|---|
| 6,554,365 B2* | 4/2003 | Karschin et al. | ........ | A47C 7/40 |
| | | | | 297/440.14 |
| 6,659,553 B2* | 12/2003 | Achleitner et al. | .... | B60N 2/646 |
| | | | | 297/452.24 X |
| 6,802,563 B1 | 10/2004 | Mysliwiec et al. | | |
| 6,817,673 B2* | 11/2004 | Walker et al. | ......... | B60N 2/002 |
| | | | | 297/440.2 X |
| 7,252,341 B2* | 8/2007 | Kircher | .................... | B60N 2/68 |
| | | | | 297/452.24 X |
| 7,967,379 B2* | 6/2011 | Walters | .................. | B60N 2/818 |
| | | | | 297/284.3 |
| 8,096,621 B2* | 1/2012 | Braun | .................... | B60N 2/682 |
| | | | | 297/440.15 |
| 8,152,238 B2* | 4/2012 | Timme | ...................... | B08B 3/02 |
| | | | | 297/440.1 X |
| 8,991,930 B2* | 3/2015 | Laframboise | .......... | B60N 2/646 |
| | | | | 297/452.26 X |
| 10,245,983 B1* | 4/2019 | Hagedorn | .............. | B32B 27/065 |
| 10,272,800 B2* | 4/2019 | Whitmore | ............... | B60N 2/646 |
| 10,369,913 B2 | 8/2019 | Duncan | | |
| 10,549,658 B2* | 2/2020 | Frye | ........................ | B60N 2/986 |
| 2006/0152062 A1* | 7/2006 | Archambault | ........... | B60N 2/99 |
| | | | | 297/452.34 |
| 2008/0136240 A1* | 6/2008 | Matthews | ................. | B60N 2/66 |
| | | | | 297/354.1 |
| 2010/0026065 A1 | 2/2010 | Butch et al. | | |
| 2011/0031790 A1* | 2/2011 | Smith, Sr. | ............... | B60N 2/663 |
| | | | | 297/230.12 |
| 2016/0297337 A1* | 10/2016 | White | ................... | B60N 2/2209 |
| 2019/0232839 A1 | 8/2019 | Welch | | |

* cited by examiner

MODULAR SEATING SYSTEM

This application claims priority to Provisional patent application No. 62/752,882, the entire contents of which are hereby incorporated by reference.

TECHNICAL FIELD

The technical field of the present invention relates to vehicle seats and seating systems.

DESCRIPTION OF THE EMBODIMENTS

Figure 1:
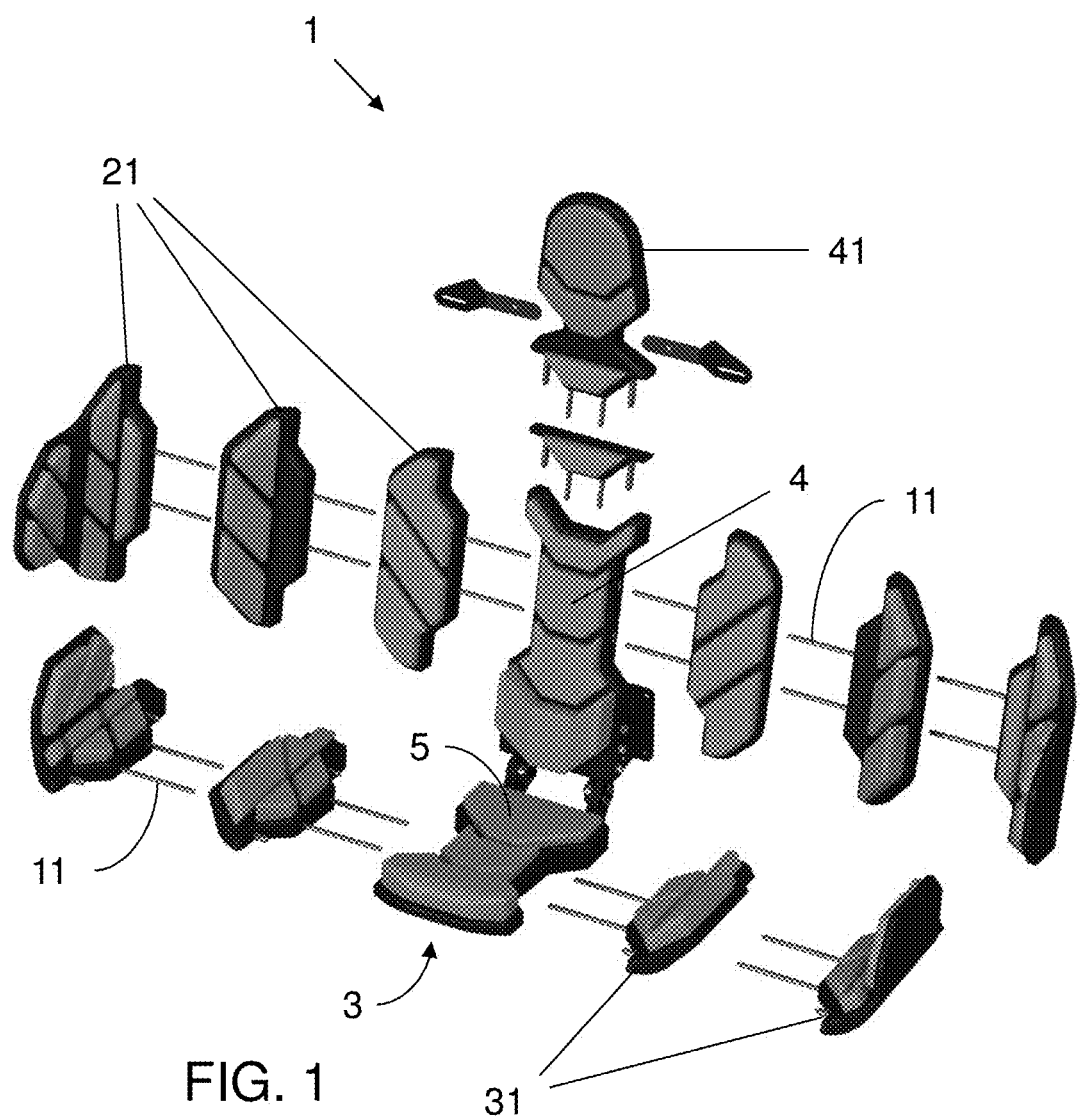
FIG. 1 is an exploded view of the modular seating system of the present invention.

The instant invention is described more fully hereinafter with reference to the accompanying drawings and/or photographs, in which one or more exemplary embodiments of the invention are shown. This invention may, however, be embodied in many different forms and should not be construed as limited to the embodiments set forth herein; rather, these embodiments are provided so that this disclosure will be operative, enabling, and complete. Accordingly, the particular arrangements disclosed are meant to be illustrative only and not limiting as to the scope of the invention. Moreover, many embodiments, such as adaptations, variations, modifications, and equivalent arrangements, will be implicitly disclosed by the embodiments described herein and fall within the scope of the present invention.

Although specific terms are employed herein, they are used in a generic and descriptive sense only and not for purposes of limitation. Unless otherwise expressly defined herein, such terms are intended to be given their broad ordinary and customary meaning not inconsistent with that applicable in the relevant industry and without restriction to any specific embodiment hereinafter described. As used herein, the article "a" is intended to include one or more items. Where only one item is intended, the term "one", "single", or similar language is used. When used herein to join a list of items, the term "or" denotes at least one of the items, but does not exclude a plurality of items of the list.

For exemplary methods or processes of the invention, the sequence and/or arrangement of steps described herein are illustrative and not restrictive. Accordingly, it should be understood that, although steps of various processes or methods may be shown and described as being in a sequence or temporal arrangement, the steps of any such processes or methods are not limited to being carried out in any particular sequence or arrangement, absent an indication otherwise. Indeed, the steps in such processes or methods generally may be carried out in various different sequences and arrangements while still falling within the scope of the present invention.

Additionally, any references to advantages, benefits, unexpected results, or operability of the present invention are not intended as an affirmation that the invention has been previously reduced to practice or that any testing has been performed. Likewise, unless stated otherwise, use of verbs in the past tense (present perfect or preterit) is not intended to indicate or imply that the invention has been previously reduced to practice or that any testing has been performed.

Referring now to the drawing figures, an exemplary modular seating system is indicated generally at reference numeral 1 and includes a universal center module 3, with a seat back portion 4, and a seat pan portion 5. Center module 3 is configured to receive an assortment of replaceable side bolsters 21, 31, at the sides of the back and pan portions 4, 5, respectively, and an assortment of replaceable headrests 41 at the top of the back portion 4 of the center module. The bolsters and headrests in the assortments may take a variety of shapes and sizes, but all are equipped with the same fastener arrangement and interchangeable.

The center module 3 includes mounting brackets and features suitable for fixing the seating system in a vehicle, such as in a driver or crew station. The seating system 1 is configured to allow for installing or changing bolsters or headrests in a vehicle while the center module 3 remains mounted. The seat mounting may be further equipped with energy attenuation capability for attenuating the effect of a blast impact on or under the vehicle.

In one exemplary embodiment the fastening feature comprises a pair of rigid parallel bars 11 extending from the bolster or headrest, and corresponding sockets 13 in the center module 3 to receive the bars, similar in that respect to many plug-in automobile headrests. The bars may be secured in the sockets with a detent feature such as a groove in the rods that seats a compliant or spring-loaded projection in the socket, or simply with a set screw.

Figure 2A:
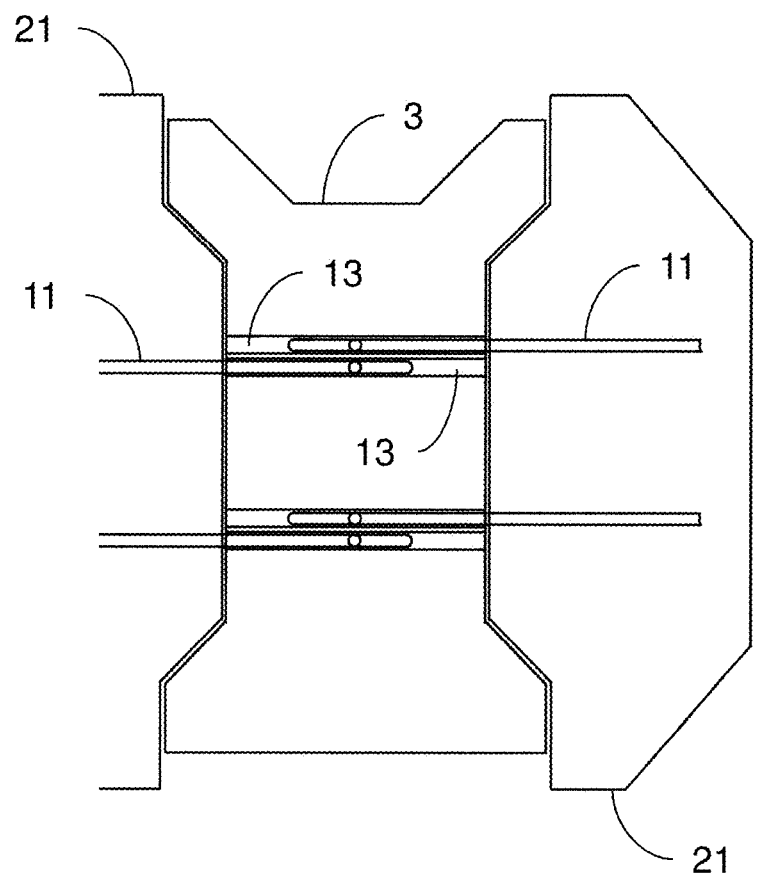
FIGS. 2A and 2B are partially cut-away front views of the modular seating system showing reversible bolsters mounted with rods received in offset and aligned sockets respectively.
Figure 2B:
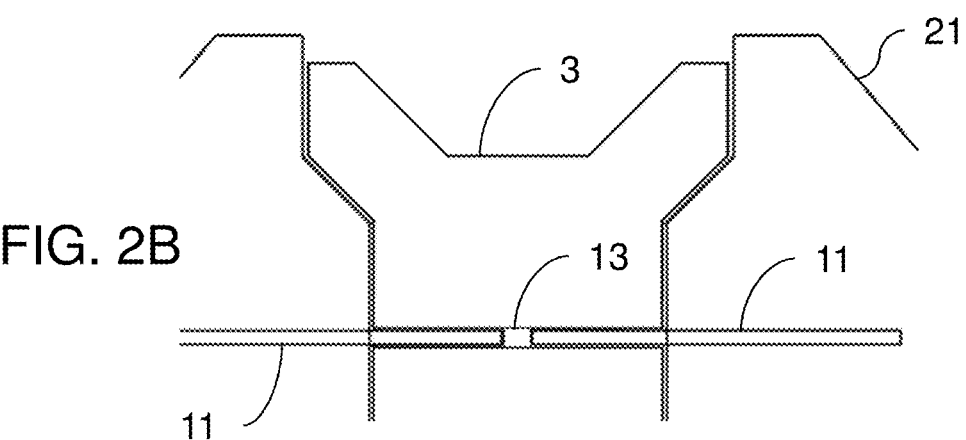

Referring now particularly to FIG. 2A, the bars 11 may be long enough to extend more than half way across the center module 3, in which case the sockets 13 may be arranged in adjacent pairs. For example, the center module may be configured with two adjacent sockets for receiving the upper bars 11 of side bolsters 21, and two more for receiving the lower bars 11 of the same bolsters (where directions such as upper, lower, left, and right as used here are from the perspective of viewing FIG. 2). The socket pairs may be in a plane parallel to a major plane of the respective seat back or seat pan, such that for example, the sockets for the left side seat pan bolster bars 11 are both slightly forward of the sockets for the right side seat pan bolster bars.

In one particular embodiment, left and right side bolsters are identical, and thus reversible. Referring still to FIG. 2A, the bars 11 extending from the bolsters 21 are vertically offset from center by the same amount as the spacing between upper and lower pairs of vertically spaced sockets 13 in seat center module 3. Thus, when a bolster is plugged into one side (right or left) of the center module, the bars 11 will align with one set of upper and lower sockets 13; and when an identical bolster is plugged into the left side of the center module, the bars 11 will align with the other adjacent set of upper and lower sockets 13, allowing identical bolsters to be plugged into both sides of the seat.

Figure 3:
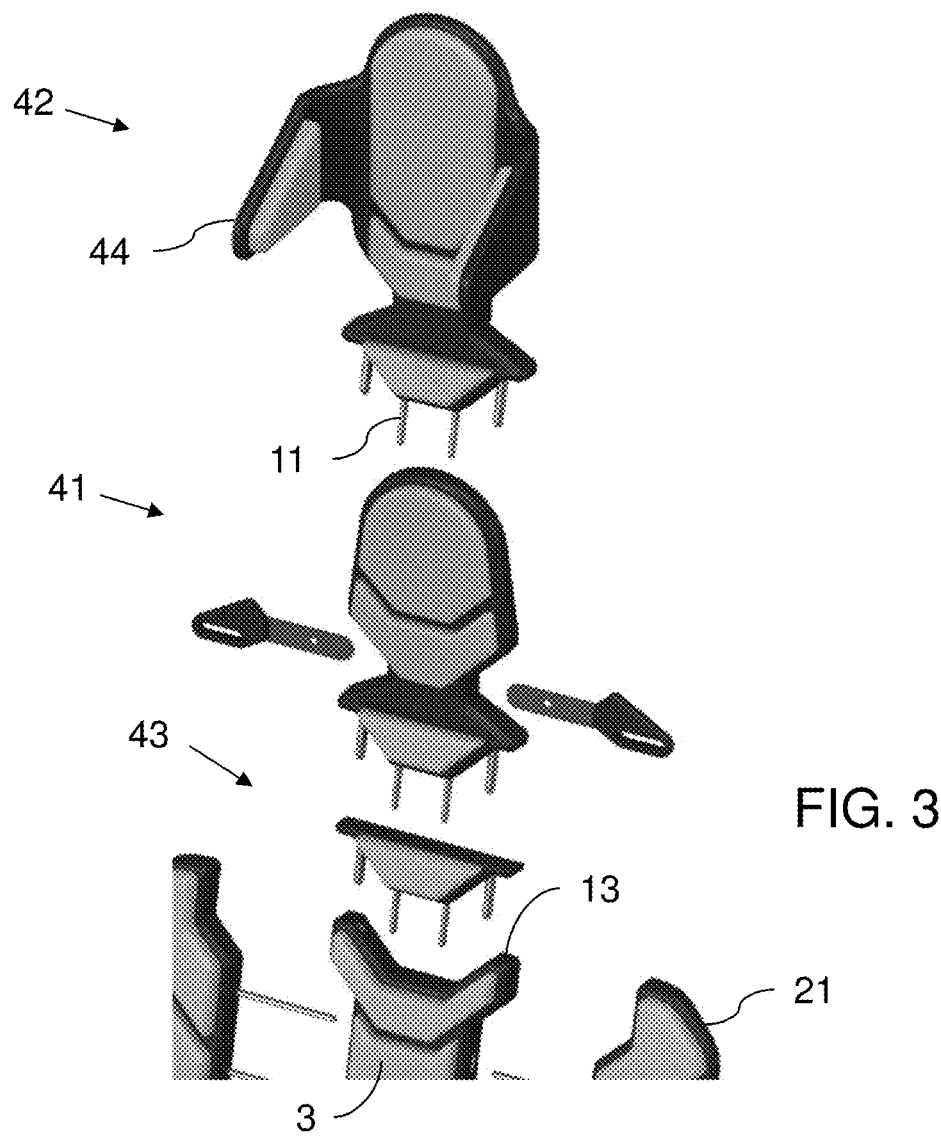
FIG. 3 is a close-up of a portion of FIG. 1 showing two plug-in headrest embodiments.

Alternatively, the seating system may be configured with sockets in either side of the center module that are aligned instead of adjacent to one another. The embodiment shown in FIG. 3 is one such example in which the left and right sockets are aligned and connect to form continuous sockets 13 across the entire seat center module 3. The bars 11 in this case may be evenly spaced from a center axis of the bolsters instead of offset as in the above described embodiment, wherein again the left and right bolsters may be identical and reversible.

Similarly, the headrest 41 may be equipped with bars 11 configured to be received in sockets 13 in the top of center module 3. FIG. 3 illustrates two headrest embodiments, 41 and 42, both equipped with identical four bar mounting configurations. Headrest embodiment 41 is essentially a padded vertical extension of the seat back to a nominal height. Headrest embodiment 42 is taller than embodiment 41, and includes side walls 44, discussed further below. Alternatively, the seating system may be configured without a headrest, by for example installing a low-profile cushioned cap 43 instead of a headrest.

Figure 4:
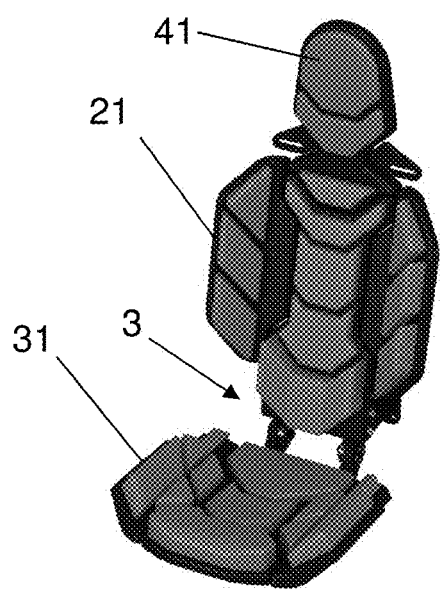
FIGS. 4 through 6 are perspective views of the seating system with the common center module and three combinations of modular bolsters and headrests.
Figure 5:
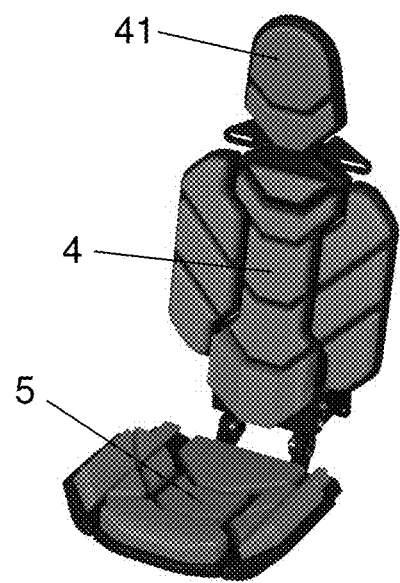
Figure 6:
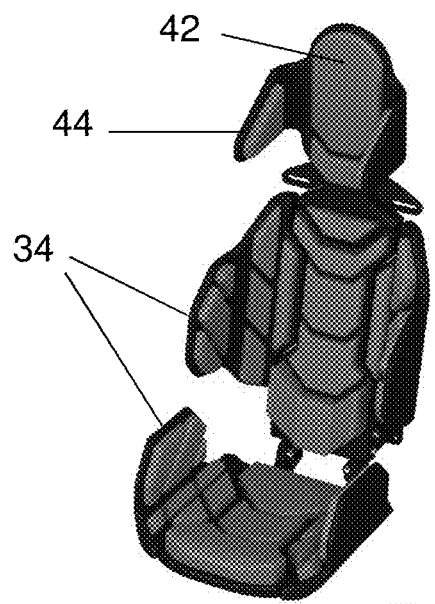

FIGS. 4 through 6 depict three different exemplary configurations of the modular seating system, all using the same center module 3. In the configuration of FIG. 4, angled side bolsters 21 and 31 are installed on the back and pan portions 4, 5, and a flat headrest 41 is at the top of the back portion 4. The configuration of FIG. 5 is the same as that of FIG. 4, except the side bolsters 21 are flat, or in plane with the seat back, instead of angled.

FIG. 6 illustrates a fully side-contained, bucket seat version of the seating system wherein the side bolsters and headrest further include side walls 34 and 44 respectively. In the depicted embodiment side walls 34, 44 extend from outer edges of the bolsters and head rest in a substantially perpendicular direction to the seating surfaces of center module 3. The side walls may be integrally formed with the bolsters and headrest as shown, or configured detachably using any suitable means such as the previously described bar and socket arrangements.

The modular seating system may include various other embodiments of the side bolsters comprising for example sets of bolsters with a range of a particular dimension or physical property. In one such example the seating system includes an assortment of matched pairs of bolsters with a range of different bolster widths to provide a seating system with a range of seat sizes. Other such dimensions or properties may include for example padding thickness, padding stiffness, and angle of the bolster to the seat back or pan portion of the center module.

Figure 7:
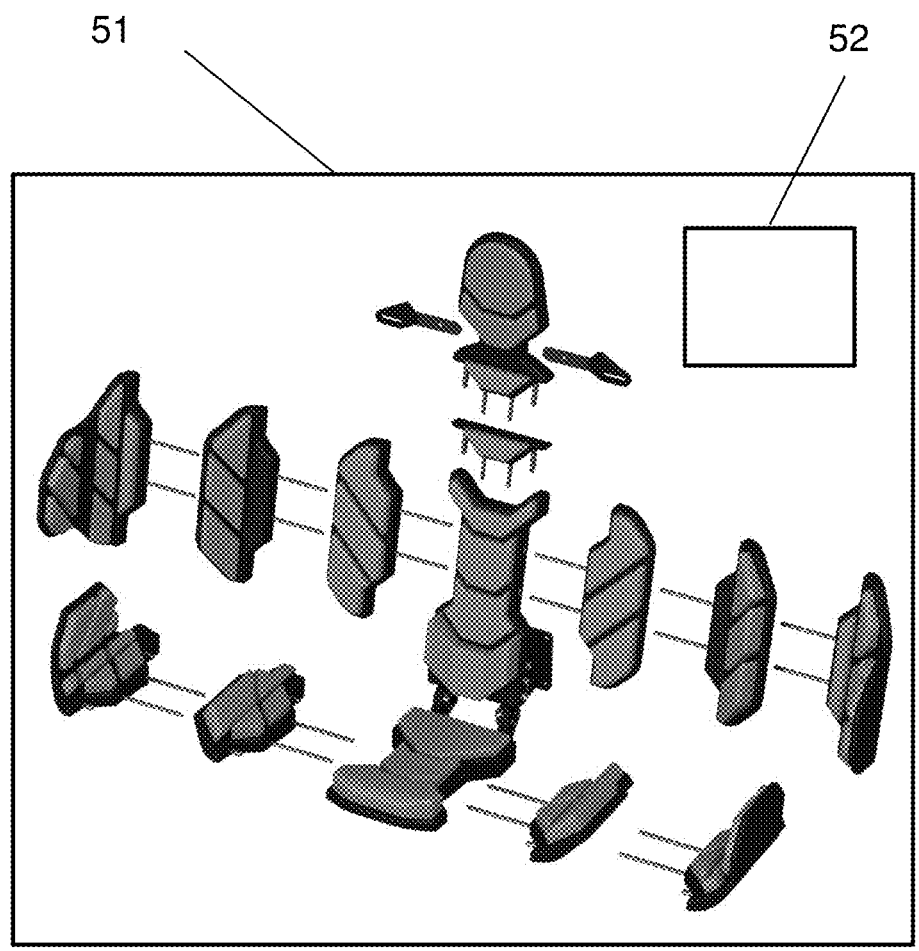
FIG. 7 is a schematic depiction of the modular seating system in a kit embodiment.

According to one embodiment, the modular seating system 1 may be arranged as a kit. Referring now to FIG. 7, an exemplary kit 51 may include a universal center module, and an assortment of side bolsters and headrests configured to detachably connect to seat back and seat pan portions of the universal center module. The kit may further include instructions 52 that detail functional relationships in relation to the structure of the modular seating system 1 (such that the seating system 1 can be used, maintained, or the like, in a preferred manner).

Figure 8:
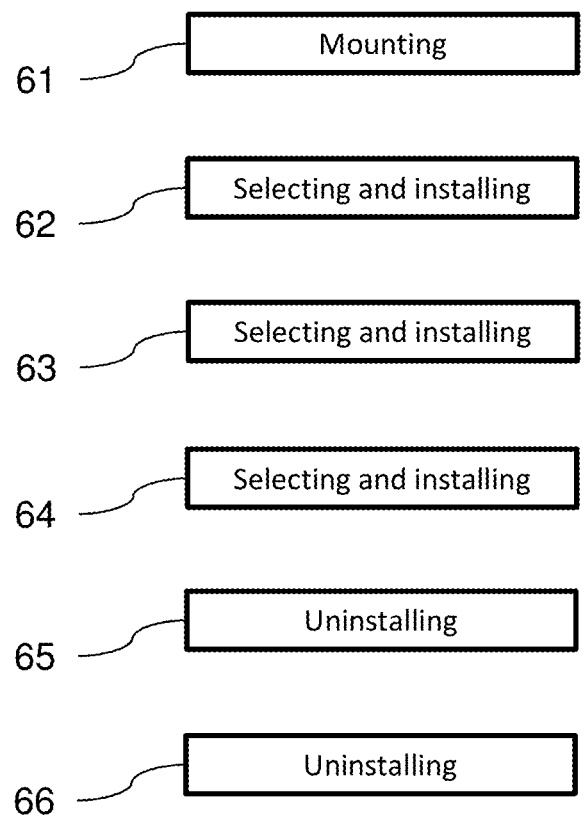
FIG. 8 is a graphic representation of an exemplary method of utilizing the modular seating system of the present disclosure.

According to another embodiment, the modular seating system comprises a method of installing and configuring a vehicle seat, wherein the modular seating system includes a universal center module, and an assortment of matching pairs of side bolsters and headrests configured to detachably connect to seat back and seat pan portions of the universal center module. Referring now to FIG. 8, a first step 61 of an exemplary method comprises mounting a universal center module having seat back and seat pan portions in a seating station of a vehicle. A second step 62 of the method comprises selecting and installing a pair of matching side bolsters on either side of the seat back portion of the center module. A third step 63 comprises selecting and installing a pair of matching side bolsters on either side of the seat pan portion of the center module. An optional fourth step 64 comprises selecting and installing a headrest on the top of the seat back portion of the center module. In the above recited steps, the bolsters and headrests may be installed by inserting rigid parallel bars extending from the bolsters and headrests into aligned sockets in the universal center module.

The method may further include a fifth step 65 of uninstalling the side bolsters from the universal center module. In the above step 65, the side bolsters may be uninstalled while the center module remains mounted in the vehicle. A sixth step 66 comprises uninstalling the headrest from the seat back portion of the universal center module.

For the purposes of describing and defining the present invention it is noted that the use of relative terms, such as "substantially", "generally", "approximately", and the like, are utilized herein to represent an inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Exemplary embodiments of the present invention are described above. No element, act, or instruction used in this description should be construed as important, necessary, critical, or essential to the invention unless explicitly described as such. Although only a few of the exemplary embodiments have been described in detail herein, those skilled in the art will readily appreciate that many modifications are possible in these exemplary embodiments without materially departing from the novel teachings and advantages of this invention. Accordingly, all such modifications are intended to be included within the scope of this invention as defined in the appended claims.

In the claims, any means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. Unless the exact language "means for" (performing a particular function or step) is recited in the claims, a construction under § 112, 6th paragraph is not intended. Additionally, it is not intended that the scope of patent protection afforded the present invention be defined by reading into any claim a limitation found herein that does not explicitly appear in the claim itself.

What is claimed is:

1. A modular vehicle seating system, comprising:
 a universal center module mountable to a seating position in a vehicle, the universal center module comprising a seat pan portion and a seat back portion;
 a matched pair of modular side bolsters selectable from an assortment of matched pairs of side bolsters, each matched pair having a particular physical property defined by a unique value in a range of values of the physical property in the assortment; and
 fasteners configured to detachably connect the side bolsters to left and right sides of the universal center module, wherein the bolsters are attachable to and removable from the universal center module while the center module is mounted in the vehicle, and wherein the fasteners are a plug-in system comprising a pair of parallel bars extending from an inside edge of the bolsters, and a pair of corresponding sockets in the center module configured to receive the pair of parallel bars.

2. The modular vehicle seating system of claim 1, further comprising a detent feature configured to engage and retain the bolsters to the center module when the bolsters are fully plugged in.

3. The modular vehicle seating system of claim 1, wherein a total length of the parallel bars is more than half a total width of the center module.

4. The modular vehicle seating system of claim 3, wherein the center module has a first pair of adjacent sockets for receiving a first pair of offset parallel bars extending from the side bolsters, and a second pair of adjacent sockets for receiving a second pair of offset parallel bars extending from the side bolsters.

5. The modular vehicle seating system of claim 1, further comprising a modular headrest selectable from an assortment of headrests having a particular physical property defined by a unique value in a range of values of the physical property in the assortment.

6. The modular vehicle seating system of claim 1, wherein the particular physical property is one of a group comprising an angle of the bolster to the seat pan or back portion of the center module, a width of the bolster, a stiffness of the bolster, or a padding thickness.

7. The modular vehicle seating system of claim 1, further comprising a kit that includes the universal center module, the assortment of matched pairs of side bolsters, a modular headrest, and instructions.

8. A method for installing and configuring a modular seating system in a vehicle, wherein the modular seating system includes a universal center module and an assortment of matching pairs of side bolsters configured to detachably connect to seat back and seat pan portions of the universal center module, the method comprising the steps of:
   mounting a universal center module having seat back and seat pan portions in a seating station of a vehicle;
   selecting and installing a pair of matching side bolsters on either side of the seat back portion of the center module;
   selecting and installing a pair of matching side bolsters on either side of the seat pan portion of the center module; and
   selecting and installing a headrest on the top of the seat back portion of the center module, wherein the bolsters and headrest are installed by inserting rigid parallel bars extending from the bolsters and headrests into aligned sockets in the universal center module.

9. The method of claim 8, wherein the step of mounting a universal center module having seat back and seat pan portions in a seating station of a vehicle is performed prior to the steps of selecting and installing the pairs of matching side bolsters.

10. The method of claim 8, further comprising the step of uninstalling the side bolsters from the universal center module.

11. The method of claim 10, wherein the step of uninstalling the side bolsters from the universal center module is performed while the center module is mounted in the vehicle.

12. The method of claim 8, wherein each pair in the assortment of matching pairs of side bolsters embodies a unique value of a particular physical property of the side bolsters within a range of values of the physical property in the assortment.

13. A modular vehicle seating system, comprising:
   a universal center module mountable to a seating position in a vehicle, the universal center module comprising a seat pan portion and a seat back portion;
   a matched pair of modular side bolsters selected from an assortment of matched pairs of side bolsters; and
   fasteners configured to detachably connect the side bolsters to left and right sides of the universal center module, wherein the fasteners are a plug-in system comprising a pair of parallel bars extending from an inside edge of the bolsters, and a pair of corresponding sockets in the center module configured to receive the pair of parallel bars.

14. The modular vehicle seating system of claim 13, wherein the bolsters are attachable to and removable from the universal center module while the center module is mounted in the vehicle.

15. The modular vehicle seating system of claim 13, further comprising a detent feature configured to engage and retain the bolsters to the center module when the bolsters are fully plugged in.

16. The modular vehicle seating system of claim 13, wherein a total length of the parallel bars is more than half a total width of the center module.

* * * * *